US010274953B1

(12) United States Patent
Agarwal et al.

(10) Patent No.: US 10,274,953 B1
(45) Date of Patent: Apr. 30, 2019

(54) MULTI-LEVEL ROBOTICS AUTOMATION

(71) Applicant: Grey Orange Pte. Ltd., Singapore (SG)

(72) Inventors: Rupesh Agarwal, Gurgaon (IN); Gaurav Kumar, Gurgaon (IN); Jai Thakkar, Dhanbad (IN); Gaurav Kejriwal, Varanasi (IN)

(73) Assignee: Grey Orange Pte. Ltd., Singapore (SG)

( * ) Notice: Subject to any disclaimer, the term of this patent is extended or adjusted under 35 U.S.C. 154(b) by 0 days.

(21) Appl. No.: 16/159,276

(22) Filed: Oct. 12, 2018

(51) Int. Cl.
| G05D 1/00 | (2006.01) |
| G06Q 10/08 | (2012.01) |
| B66F 9/06 | (2006.01) |
| G05D 1/02 | (2006.01) |

(52) U.S. Cl.
CPC ........... G05D 1/0027 (2013.01); B66F 9/063 (2013.01); G05D 1/0274 (2013.01); G06Q 10/087 (2013.01); G05D 2201/0216 (2013.01)

(58) Field of Classification Search
CPC .............. G05D 1/0027; G05D 1/0274; G05D 2201/0216; G06Q 10/087; B66F 9/063
USPC ......................................................... 700/245
See application file for complete search history.

(56) References Cited

U.S. PATENT DOCUMENTS

| 8,594,835 | B2 * | 11/2013 | Lert | B65G 1/045 |
| | | | | 700/221 |
| 8,998,554 | B2 * | 4/2015 | Toebes | B65G 1/04 |
| | | | | 414/273 |
| 9,694,977 | B2 * | 7/2017 | Aprea | G05D 1/0297 |
| 9,785,911 | B2 * | 10/2017 | Galluzzo | B25J 5/007 |
| 9,850,079 | B2 * | 12/2017 | Cyrulik | B65G 1/1373 |
| 2012/0189410 | A1 * | 7/2012 | Toebes | B65G 1/0492 |
| | | | | 414/273 |
| 2012/0195720 | A1 * | 8/2012 | Sullivan | B65G 1/04 |
| | | | | 414/277 |
| 2013/0245810 | A1 * | 9/2013 | Sullivan | G06Q 10/08 |
| | | | | 700/214 |
| 2016/0207709 | A1 * | 7/2016 | Pankratov | B65G 1/0492 |
| 2016/0364681 | A1 * | 12/2016 | Andrus | G06Q 10/087 |
| 2017/0107055 | A1 * | 4/2017 | Magens | G05D 1/021 |
| 2018/0082162 | A1 * | 3/2018 | Durham | G06K 7/10009 |
| 2018/0127211 | A1 * | 5/2018 | Jarvis | G06Q 10/08 |
| 2018/0127212 | A1 * | 5/2018 | Jarvis | B65G 1/0435 |
| 2018/0158016 | A1 * | 6/2018 | Pandya | G06Q 10/087 |

(Continued)

Primary Examiner — Jaime Figueroa
(74) Attorney, Agent, or Firm — Oblon, McClelland, Maier & Neustadt, L.L.P.

(57) ABSTRACT

A method includes receiving a request to transport an item from a first location to a second location; selecting a bot for transporting the item from the first location to the second location; determining a first vertical level associated with an initial location of the selected bot and a second vertical level associated with a destination of the selected bot; determining whether the first vertical level associated is different than the second vertical level. The method further includes, in response to the determination that the first vertical level is different from the second vertical level, (a) selecting a transport device configured to transfer the selected bot from the first vertical level to the second vertical level in a vertical direction; and (b) outputting a control signal to the selected bot causing the selected bot to move to a first position associated with the selected transport device.

20 Claims, 17 Drawing Sheets

(56) References Cited

U.S. PATENT DOCUMENTS

2018/0305125 A1* 10/2018 Guo .................... B65G 1/1373
2018/0321687 A1* 11/2018 Chambers ............ G05D 1/0276

* cited by examiner

MULTI-LEVEL ROBOTICS AUTOMATION

BACKGROUND

A warehouse floor may include a plurality of storage racks that each contain one or more items. When an item is to be retrieved from one of the plurality of storage racks, a robot may be used to transport the one of the plurality of storage racks to a retrieval location at which the item is retrieved from the one of the plurality of storage racks. The transport path taken by the robot may depend on various factors such as a layout of the warehouse floor.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

According to an embodiment of the present disclosure, there is provided a method for multi floor robotics automation. The method includes receiving a request to transport an item from a first location to a second location; selecting, using processing circuitry of a server, a bot from a plurality of bots for transporting the item from the first location to the second location, the bot selected based on at least a type of the item to be transported; determining, using the processing circuitry, a first vertical level associated with an initial location of the selected bot and a second vertical level associated with a destination of the selected bot; and determining whether the first vertical level associated with the initial location of the selected bot is different than the second vertical level associated with the destination of the selected bot. The method further includes, in response to the determination that the first vertical level is different from the second vertical level, (a) selecting, using the processing circuitry, a transport device configured to transfer the selected bot from the first vertical level to the second vertical level in a vertical direction; and (b) outputting a control signal to the selected bot, the control signal causing the selected bot to move to a first position associated with the selected transport device.

According to an embodiment of the present disclosure, there is provided a system for multi floor robotics automation. The system includes one or more transport devices configured to transfer bots in a vertical direction; a plurality of bots; and a server including processing circuitry. The processing circuitry is configured to receive a request to transport an item from a first location to a second location, select a bot from the plurality of bots for transporting the item from the first location to the second location, the bot selected based on at least a type of the item to be transported, determine a first vertical level associated with an initial location of the bot and a second vertical level associated with a destination of the selected bot, determine whether the first vertical level associated with the initial location of the selected bot is different than the second vertical level associated with the destination of the selected bot, and in response to the determination that the first vertical level is different from the second vertical level, (a) select a transport device from the one or more transport devices to transfer the selected bot from the first vertical level to the second vertical level, and (b) output a control signal to the selected bot, the control signal causing the selected bot to move to a first position associated with the selected transport device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
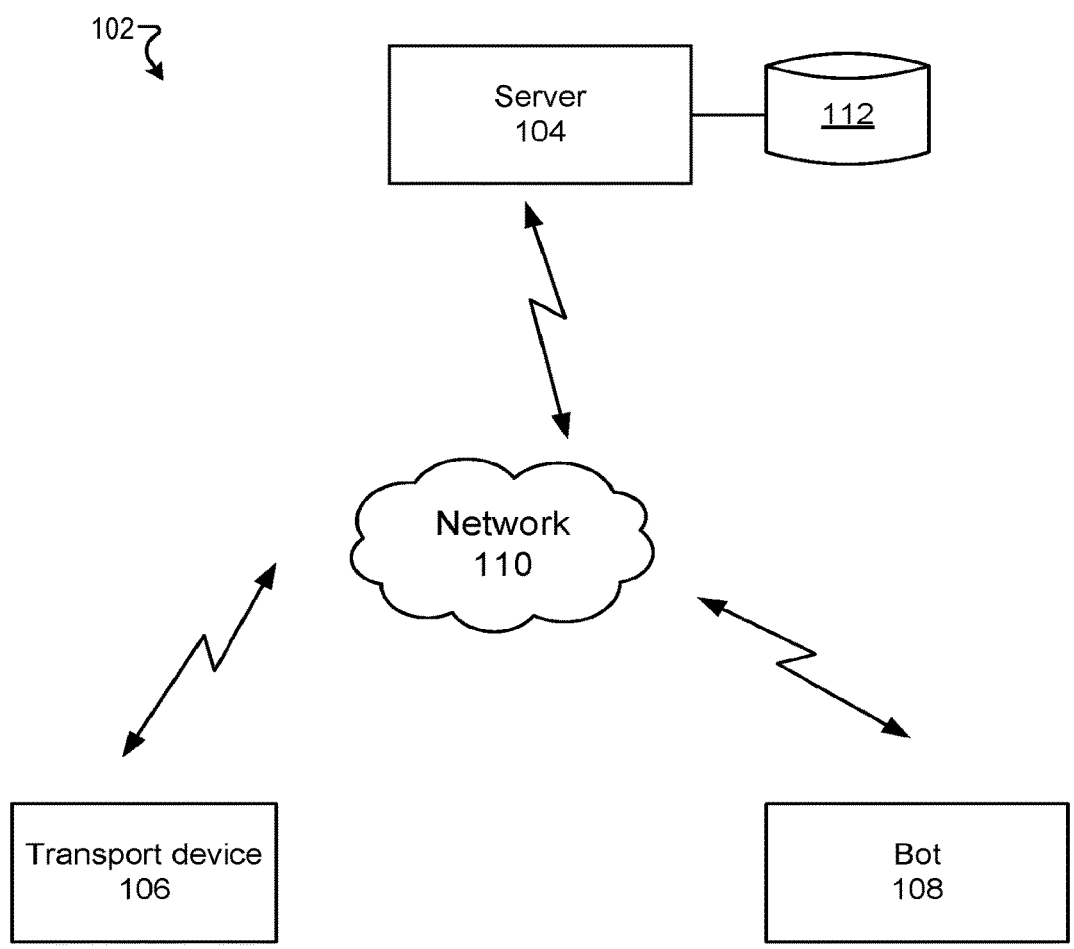
FIG. 1 is a schematic that shows a storage and retrieval system according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a system and associated methodology for multi-level robotics automation.

Described herein is a flexible system that optimizes the usage of both vertical and horizontal space in a warehouse. The warehouse may be a multi-floor warehouse. Multi-floor warehouses are used to manage required inventory storage capacity when the warehouse is space constrained horizontally. As described further below, racks can be transported across vertical floors by robots using lifts. Lifts may be used to move the robots between floors or when the robots transport an inventory storage rack across floors to an optimal storage location, to a pick and pack workstation, to a dock for transportation, or the like as would be understood by one of ordinary skill in the art.

The disclosed embodiments provide significantly advantageous features. For example, as further described herein, vertical space utilization is optimized. Thus, a larger amount of inventory can be stored and hence procured in a warehouse. Furthermore, embodiments of the disclosed system do not require manual intervention, thereby increasing the efficiency of pick/put operation. Additionally, the system may be integrated with other GTP (good to person) technologies and in brown-field warehouses.

FIG. 1 is a schematic that shows a storage and retrieval system 102 according to one example. The storage and retrieval system 102 may be implemented in a retail distribution center or warehouse. The warehouse may include multiple levels (e.g., multiple floors, multiple subfloors, or mezzanine levels). The storage and retrieval system 102 may include a server 104, one or more transport devices 106 (e.g., lift, elevator), and one or more robots 108 (referred to herein as "bots").

The server 104 may receive orders from multiple customers. Each order may specify one or more items available in the warehouse. The one or more items of each order may be retrieved from storage. Further, the server 104 may receive requests from an operator to store one or more items. The one or more items to be stored or retrieved may be transported via the bots 108. The server 104 may include a processor 202 and communication circuitry 204 as shown in FIG. 2.

The server 104 may coordinate operations between the one or more transport devices 106 and the one or more bots 108. The server 104 may also control the speed, position, and acceleration of each of the one or more transport devices 106 and the bots 108.

The server 104, the one or more transport devices 106, and the one or more bots 108 may communicate via a network 110. The network 110 may be a wired network, a wireless network, or a combination of a wireless and wired network using any suitable type and/or number of communication protocols. The server 104 may be communicatively coupled to a database 112. The database 112 may store a log of the status of each of the one or more transport devices 106 and each of the one or more bots 108. The database 112 may be a cloud based database. Further, the database 112 may store information and specification associated with each transport device 106. For example, the database 112 may store any one or a combination of transport device type, a position (e.g., coordinates relative to the warehouse), a maximum load threshold, a maximum speed, maximum capacity, floors and/or locations serviced by the transport device 106 for each transport device 106.

Figure 2:
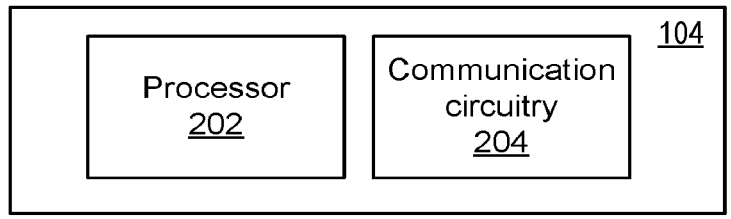
FIG. 2 is a block diagram that shows components of a server, a bot, and a transport device according to one example.
Figure 2:
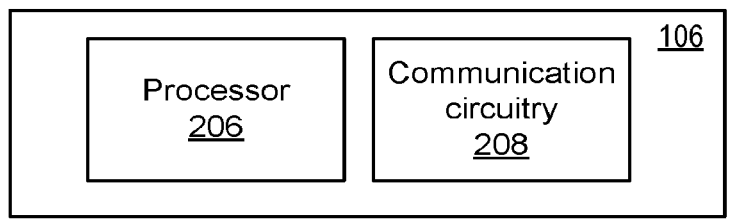
Figure 2:
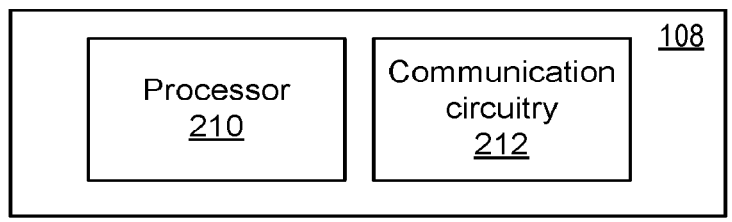

The bot 108 may include a processor 210 and communication circuitry 212 as shown in FIG. 2. The bot 108 may be controlled via the server 104 via the network 110. In some embodiments, the bot 108 movement may be controlled by markers (e.g., barcodes). For example, the sever 104 may output a command to the bot 108 to move from a first barcode associated with a first location to a second barcode associated with a second location. The bot 108 may output bot parameters to the server 104 such as the bot position, bot velocity, bot status, and the like. The bots may use optical, Bluetooth, and radio frequency (RF) guidance mechanism to move between different locations.

A transport device 106 may include processing circuitry 206 and communication circuitry 208 as shown in FIG. 2. The transport device 106 may be configured to transport one or more bots (e.g., loaded or unloaded) of the same or different type. The transport device 106 may be an elevator, escalator, conveyor, cantilever system, or any other device that is capable of moving a bot 108 to one or more different locations. The transport device 106 may also include sensors that detect the position of the bot 108 inside the transport device. In some embodiments, the server 104 may optimize the order in which the bots are loaded/unloaded in the transport device 106. The transport device 106 may include movable and non-movable transport devices (i.e., not at fixed location). The transport device 106 may be moved between floors or between various areas of a floor of the warehouse. The coordinates of the transport device 106 may be updated in the database 112 in response to detecting a change in the position of the transport device 106. The position of a movable transport device 106 may be determined by the system 102 based on demand and throughput of an area of the warehouse.

The transport device 106 may transport bots in the vertical and/or horizontal direction. The transport device 106 may have a single opening, two openings, or three or more openings. The openings may be of the same or different dimensions. An opening may be used as an entrance/exit, an entrance, or an exit. The system 102 may include transport devices 106 of the same type or different types. The different types of transport devices 106 may have one or a combination of different number of openings, dimensions, maximum load thresholds, maximum capacities (e.g., based on one or more dimensions), service areas, etc.

The bot 108 and the transport device 106 may communicate via a predetermined communication channel to provide redundancy and an additional security layer in communications. As an example, the bot 108 and transport device 106 may communicate using the HTTP protocol. For example, the server 104 may output one or more control signals to the bot 108 to move to the transport device 106 and to a position inside the transport device 106. The bot 108 may be instructed to move to one of a plurality of markers located on the transport device 106 or to a location that is relative to a marker located in the transport device 106 or located at an entrance to the transport device 106.

In a multi-floor warehouse, vertical space is utilized in the warehouse and inventory is stored in all the floors of the warehouse. Inventory can be transported in racks to different floors for pick/put operations or storage using the transportation devices and/or the bots 108. Pick/put stations may be located on one or more floors of the warehouse. Bots may move with or without racks across floors using the transportation devices 106. The system 102 manages movements of the inventory (i.e., initial location, relocation), the floors, the transportation devices, and the bots.

The server 104 may identify a preferred storage level in the warehouse based on a plurality of factors. For example, the preferred storage level may be selected for an item/article based on an article type. The preferred storage level may also be selected based on a throughput of the item type. For example, the server 104 may retrieve the throughput of an item from the database 112 when a request to store an item is received. Then, the server 104 may identify a storage location of a storage rack for the item which minimizes the time to transport the item and/or the usage of the transport device 106. The preferred storage may be a function of the availability of the transport devices, floating floors, and false floors in the warehouse. The server 104 may determine a preferred layout of each floor of the warehouse. The server 104 also determines the flow of inventory (in/out) of each floor. Fast moving inventory may be stored at the lowest level of the warehouse while slow moving inventory may be stored at an upper level of the warehouse. Further, fast moving inventory location may be determined based on throughput (i.e., to maximize throughput efficiency). Slow moving inventory location may be determined based on space (i.e., to maximize space efficiency). For example, when determining the location of an item having a low throughput (i.e., throughput below a predetermined value), the server 104 may associate a higher weight to the space among other plurality of factors (e.g., retrieval time).

The server 104 may also determine the height of the inventory. The server 104 may create stacks that can be moved by the bots. Stacks may be stocked on top of each other in order to maximize the usage of the vertical space. For example, the vertical height of the floor may be 4 meters and the racks may be 3 meters in height. The space between the last rack and the ceiling (i.e., 1 meter) may be filled with the stacks. The server 104 selects the type of inventory to be stacked at the upper level. The server 104 stores updates to the inventory/information in the database 112.

Bots 108 may include elevating bots that are capable to retrieve items from various vertical inventory levels. In other words, the bots 108 may move in a vertical direction to reach the racks and/or pellets stored at a high level. In one example, the bot 108 may retrieve a rack from an upper level and transport the rack to a ground level of the warehouse. The server 104 may select the bot 108 to transport the rack based on the size and weight of the rack to be transported. Racks may be used to store pellets at a high level above grounds (e.g., 9 meters).

In some embodiments, the elevating bots are implemented using a rack system. The bots 108 are transported on a rack. The rack may elevate the bots to a height so it can pull inventory from any vertical level. Additionally or alternatively, mobile pallet units may be used.

Each floor of the warehouse has different capabilities such as equipment to lift heavy items. Other capabilities include floor capacity, limitations, and characteristics (e.g., temperature controlled, highly secure zone). Thus, each floor may be associated with a specific type of inventory. Additional floors may be added to the warehouse based on the inventory. For example, the server 104 may reconfigure the floating floors in response to detecting an increase/decrease in the specific type of inventory.

The warehouse may include two or more buildings. The server 104 may coordinate the movement of the bots 108 between various buildings of the warehouse.

In one example, the server 104 may monitor the level of inventory of each item at a specific level (e.g., ground level). In response to determining that the level of inventory of an item is below a predetermined threshold, the server 104 may control one or more bots to move a stack of the item from a storage level to the specific level. For example, the item may be moved from an upper level to the ground level when the ground level has a shortest retrieval time. The factors for determining an optimal storage level may be weighted independently and include, but are not limited to (i) a consumption pattern of a stock keeping unit (SKU), (ii) weight and physical properties of the SKU, (iii) storage density requirements (e.g., a particular floor may be offering high density storage which may be required for fulfilling an order), and (iv) affinity requirements (e.g., certain SKUs are not kept with other SKUs which are fast moving and generally kept on lower floors).

Figure 3:
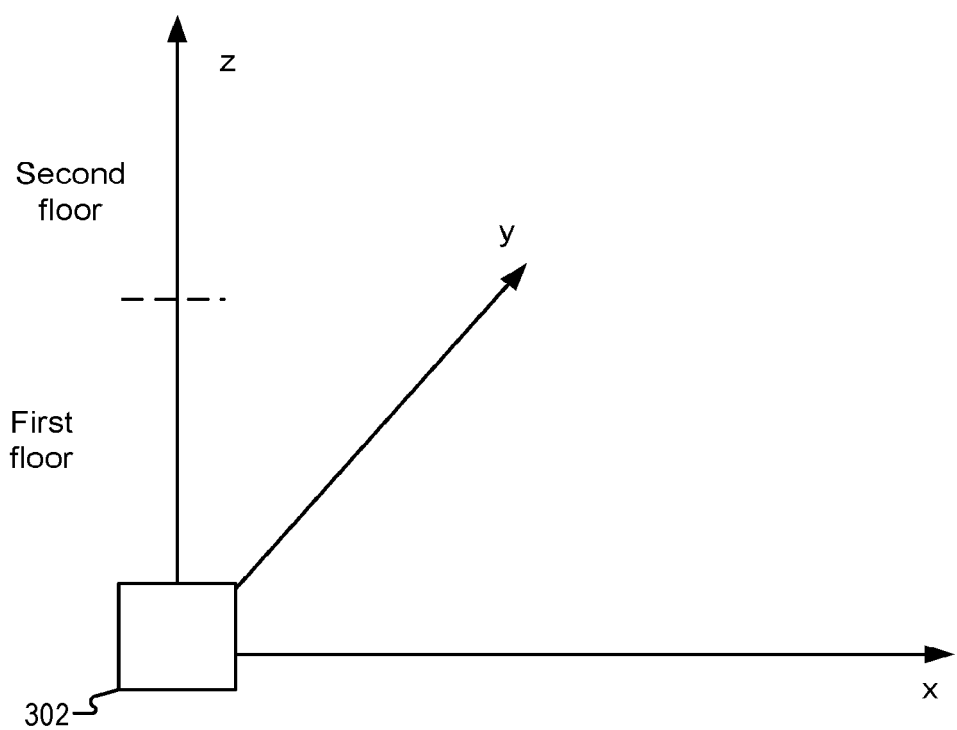
FIG. 3 is a schematic that shows a coordinate system of the transport device according to one example.

FIG. 3 is a schematic that shows an embodiment of a coordinate system of the transport device 302 according to one example. An origin of the coordinate system may be associated with the transport device 302. In one example, the vertical level of each floor may be associated with the z-coordinate. The vertical level may be associated with a floor, a dynamic floor, or a false floor. The server 104 may update the coordinate of each floor in the database 112 when the floating floors are reconfigured. Further, the coordinates of the location of each transport device are stored in the database 112.

Figure 4:
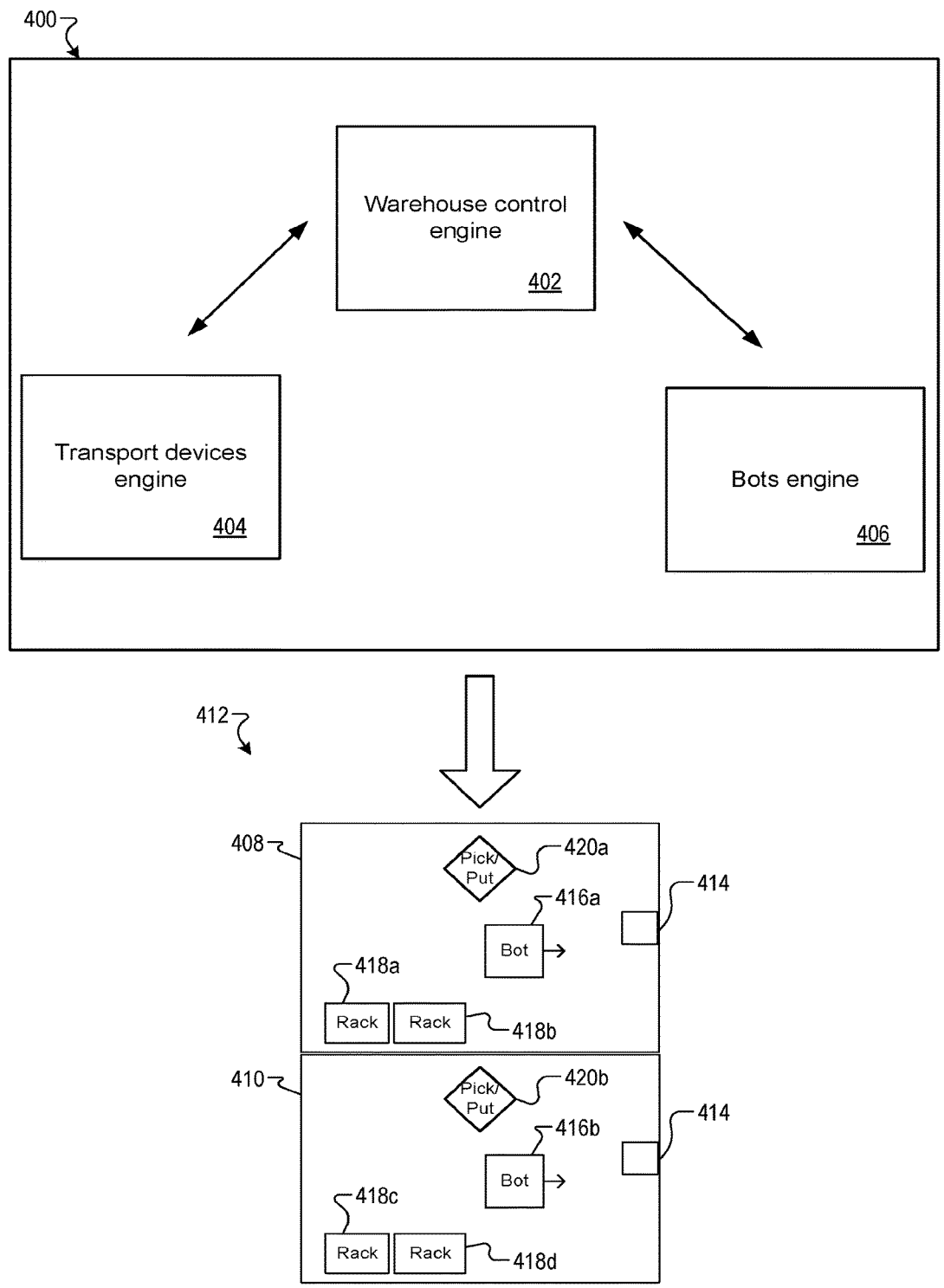
FIG. 4 is a schematic that shows the system architecture for the storage and retrieval system according to one example.

FIG. 4 is a schematic that shows an embodiment of the system architecture 400 for the storage and retrieval system 102 according to one example. The system architecture 400 includes the warehouse control engine 402, a transport devices engine 404, and a bots engine 406. In one example, the warehouse control engine 402, a transport devices engine 404, and a bots engine 406 may be implemented by the server 104. The engines and modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

The warehouse control engine 402 outputs control commands to the transportation devices engine 404 and the bots engine 406. The transport devices engine 404 controls the transportation devices 106. The bots engine 406 controls the bots 108 based on the control commands received from the warehouse control engine 402. The warehouse control engine 402 may manage a warehouse 412. In FIG. 4, the warehouse 412 may include a first floor 408 (or a first vertical level) and a second floor 410. A transport device 414 transports the bots 416a and 416b between the first floor 408 and the second floor 410. The warehouse 412 may also include racks 418a-d. The bots 416a and 416b may transport the racks between the first floor 408 and the second floor 410. Each floor may also include a pick/put area. The first floor 408 includes a first pick/put area 420a and the second floor 410 includes a second pick/put area 420b.

Figure 5:
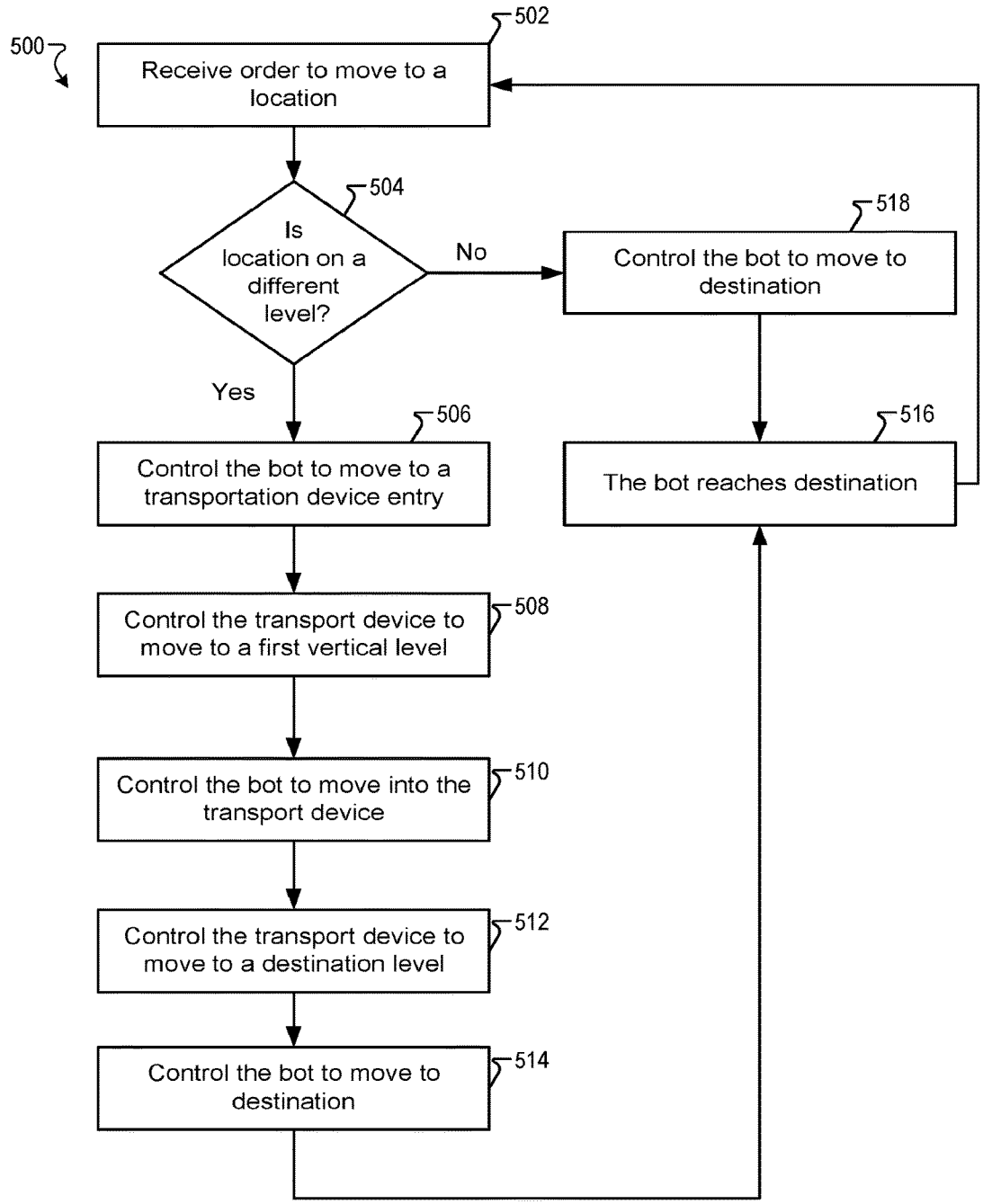
FIG. 5 is a flowchart for a process for controlling the transport device and the bot according to one example.

FIG. 5 is a flowchart illustrating an embodiment of a process 500 for controlling the transport device 106 and the bot 108 according to one example. At step 502, the warehouse control engine 402 may receive an order requiring moving the bot 108 to a new location (i.e., destination). At step 504, the warehouse control engine 402 may determine whether the new location is at a different vertical location from the bot's current position. In response to determining that the new location is at a different level resulting in a yes at step 504, the process proceeds to step 506. In response to determining that the new location and the bot's current position have the same vertical level (e.g., equal z coordinate) resulting in a No at step 504, the process proceeds to step 518. At step 518, the warehouse control engine 402 may output a control command to the bots engine 406 to move the bot 108 to the new location.

At step 506, the warehouse control engine 402 may output a command to the bots engine 404 to move the bot to a transport device entry. The warehouse control engine 402 may select the bot 108 and the transport device 106 using the processes shown in FIGS. 7 and 10.

At step 508, the warehouse control engine 402 may output a command to the transport devices engine 404 to move the transport device 106 to the vertical level of the bots current position. At step 510, the warehouse control engine 402 may output a control command to the bots engine 406 to move the bot 108 into the transport device 106. In turn, the bots engine 406 may output a control signal to the bot 108 to move into the transport device 106. At step 512, the warehouse control engine 402 may output a command to the transport device engine 404 to move the transport device 106 to the vertical level of the new location or destination. At step 514, the warehouse control engine 402 outputs a control command to the bots engine 406 to move the bot 108 to the destination in response to determining that the transport device 106 has reached the vertical level of the new location. At step 516, the warehouse control engine 402 may update the status of the bot to "available" when the bot reaches the new location.

Figure 6A:
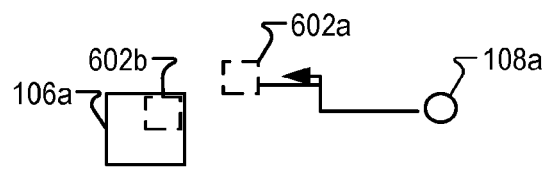
FIGS. 6A and 6B are schematics that show multiple positions associated with a lift according to one example.
Figure 6A:
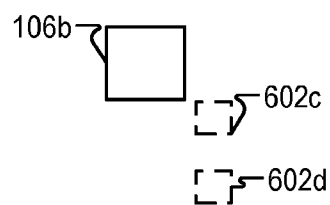

FIG. 6A is a schematic that shows predefined positions associated with each transport device 106a, 106b according to one example. Position 602a is associated with transport device 106a. A bot 108a may proceed to position 602a then to position 602b inside of the transport device 106a when the transport device 106a is ready. For example, the server 104 instructs the bot 108a to enter the transport device 106a when the server 104 determines that the transport device 108 is ready to move the bot 108a to another location. Multiple predefined positions 602c, 602d may also be associated with a transport device 106b.

Figure 6B:
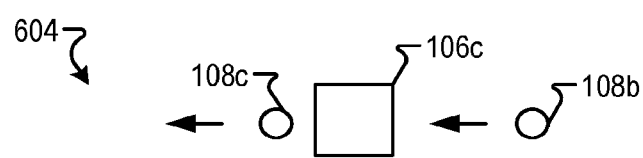
Figure 6B:
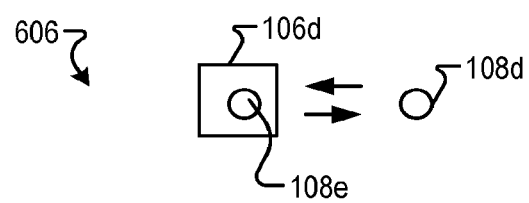

FIG. 6B is a schematic that shows an illustration of the movement of the bots according to one example. Schematic 604 shows a bot 108b entering transport device 106c from a predetermined entrance side and a bot 108c exiting the transport device 106c via a predetermined exit side. For a transport device with multiple openings, each opening may be assigned as an entrance side or an exit side dynamically or on a fixed basis. Further, the number of usable openings may differ depending on the transport destination floor or location. Schematic 606 shows bots 108d, 108e, exiting and entering the lift 106d from a single side.

In one embodiment, the server 104 determines a transport path for a bot from a first position to a second position. The path may include a change in the vertical level via one or more transport devices 106. The path may be identified based on information about the location of bots in the warehouse, transport devices 106, and the like. The server 104 may transmit to the bot 108 information associated with the path. For example, the server 104 may output a series of instructions relative to markers in a specific order for the bot 108 to follow. The server 104 may identify the transport device to be used based on a plurality of factors. The plurality of factors may include the type of transport device 106, type of load carried by the transport device 106, proximity of the bot 108 to the transport device 106, current location of the transport device 106 (e.g., in the case of an elevator), the areas (e.g., floors) serviced by the transport device 106, transport speed of the transport device 106, etc. For example, a bot 108 carrying a fragile item may be transported using a slow moving transport device 106. The server 104 may assign all bots 108 loaded with fragile items to a single transport device 106. Then, the server 104 may output a control signal to the transport device 106 to control the speed of the lift to a suitable speed retrieved from database 112 based on the item type. A heavy item is assigned to a lift that has a load threshold greater than the weight of the item. An exemplary process is shown in FIG. 7.

Figure 7:
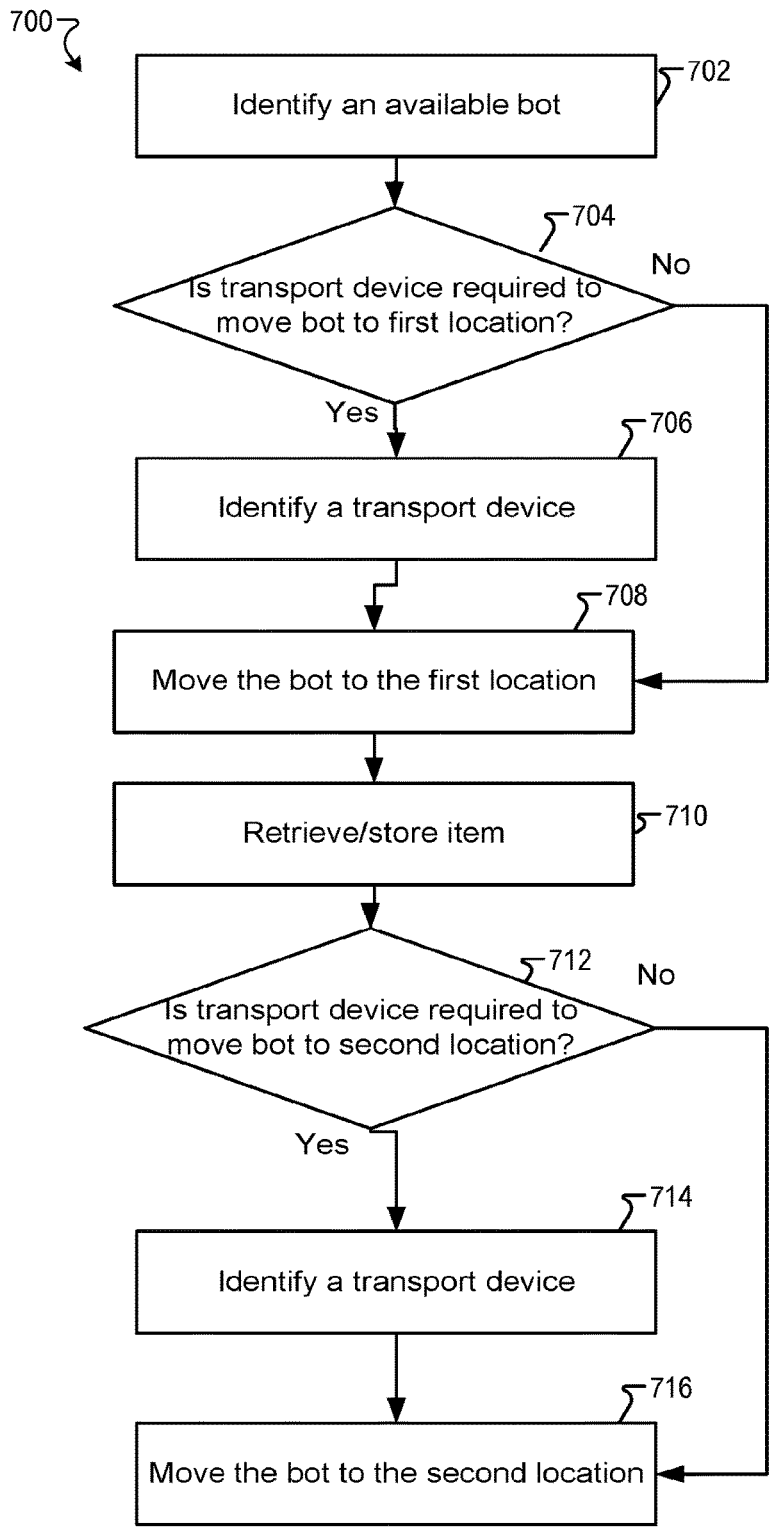
FIG. 7 is a flowchart for a process for transporting an item from a first location to a second location according to one example.

FIG. 7 is a flowchart illustrating an embodiment of a process 700 for controlling a bot 108 to transport an item from a first location to a second location according to one example. In some embodiments, the process 700 is implemented by the server 104.

At step 702, the server 104 identifies a bot 108 that is available to transport the item. When a plurality of bots 108 are available to perform the task, one of the plurality of bots 108 may be selected based on the proximity of the bot 108 to the storage rack.

At step 704, the server 104 may determine whether a transport device 106 is needed for the available bot 108 to move to the first location. For example, the service 104 determines whether a vertical level associated with the first location corresponds to the vertical level of the available bot. In response to determining that a transport device 106 is not needed (e.g., when the vertical level associated with the first location corresponds to the vertical level of the available bot), the process proceeds to step 708. In response to determining that a transport device 106 is needed (e.g., when the vertical level associated with the first location does not correspond to the vertical level of the available bot), the process proceeds to step 706.

At step 706, the server 104 identifies a transport device 106 to transport the bot. For example, the transport device 106 transports the bot 108 to a vertical level of the first location based on any one or a combination of the plurality of factors described previously herein. The plurality of factors may not include the type of the item when the process is to retrieve a storage rack, store an item or a storage rack that is empty.

At step 708, the server 104 outputs one or more control signals to the bot 108 to move the bot 108 to the first location. The server 104 may also send one or more control signals to the transport device 106 when needed. At step 710, the server 104 outputs one or more control signals to the bot 108 to retrieve/store the item. For example, the bot 108 is instructed to lift or lower a storage rack that contains the item.

At step 712, the server 104 determines whether a transport device 106 is needed for the bot 108 to move to the second location. For example, the service 104 determines whether a vertical level associated with the bot corresponds to the vertical level of the second location. In response to determining that a transport device 106 is not needed (e.g., when the vertical level associated with the second location corresponds to the vertical level of the first location), the process proceeds to step 416. In response to determining that a transport device 106 is needed (e.g., when the vertical level associated with the second location does not correspond to the vertical level of the first location), the process proceeds to step 714.

At step 714, the server 104 identifies a transport device 106 based on any one or a combination of the plurality of factors described previously herein. The plurality of factors may not include the type of item when the request is to retrieve a storage rack to store an item or a storage rack that is empty. At step 716, the server 104 may send control signals to the bot to move to the second location. The server 104 may also send control signals to the transport device 106 when needed.

Although the flow charts show specific orders of executing functional logic blocks, the order of executing the logic blocks may be changed relative to the order shown, as will be understood by one of ordinary skill in the art. Also, two or more blocks shown in succession may be executed concurrently or with partial concurrence.

In certain embodiments, one or more barriers (e.g., one or more boom barriers, doors, movable floor barriers, etc.) may be provided at an opening of the transport device 106 for safety and/or to prevent a bot from attempting to enter/exit a transport device 106 when the transport device 106 is not available and/or ready. Each barrier may be separately controlled by the server 104. The server 104 may send control signals to the barrier to open/close based on the status of the transport device 106. The barrier may also be controlled by the processing circuitry 206 of the transport device 106.

In some embodiments, the barrier may be substantially a bar or gate like barrier that may be linearly raised and lowered for blocking, for example, an entrance/exit of the transport device 106 (e.g., an elevator). The barrier may be raised or lowered in any suitable manner. In some embodiments an entry and exit barrier are the same on a particular floor (e.g., single type entry). In other embodiments, the entry and exit barrier are opposite to each other on a particular floor (e.g., double type entry).

In some embodiments, the transport device 106 is controlled based on a barrier identification information (e.g., a barrier identifier). For example, the server 104 outputs a barrier identification information to a transport device 106 that is associated with a barrier of the barrier identifier. The transport device 106 may determine the location (e.g., vertical level) based on the barrier identification. A first arithmetic operation may be applied to the barrier identification information. For example, a first number may be subtracted from the barrier identification information (e.g., one). Then, a second arithmetic operation may be applied (e.g., division by a predetermined number). The quotient obtained after the second arithmetic operation may indicate the location (e.g., the vertical level). As an example, the server 104 may send the transport device 106 a signal including "1" as the barrier identification information. Then, the transport device 106 implements the first arithmetic operation: $1-1=0$, and the second arithmetic operation $0/2=0$. Thus, the transport device 106 may go to a location (e.g., vertical level) associated with "0". The transport device 106 may output a control signal to the barrier to open once the transport device 106 reaches the location associated with "0". As another example, the server 104 may send the command "2" to the transport device 106. The transport device 106 via the processing circuitry 206 may implement the first arithmetic operation $2-1=1$ and the second arithmetic operation $1/2=0$. Thus, the transport device 106 goes to the location associated with "0".

Figure 8:
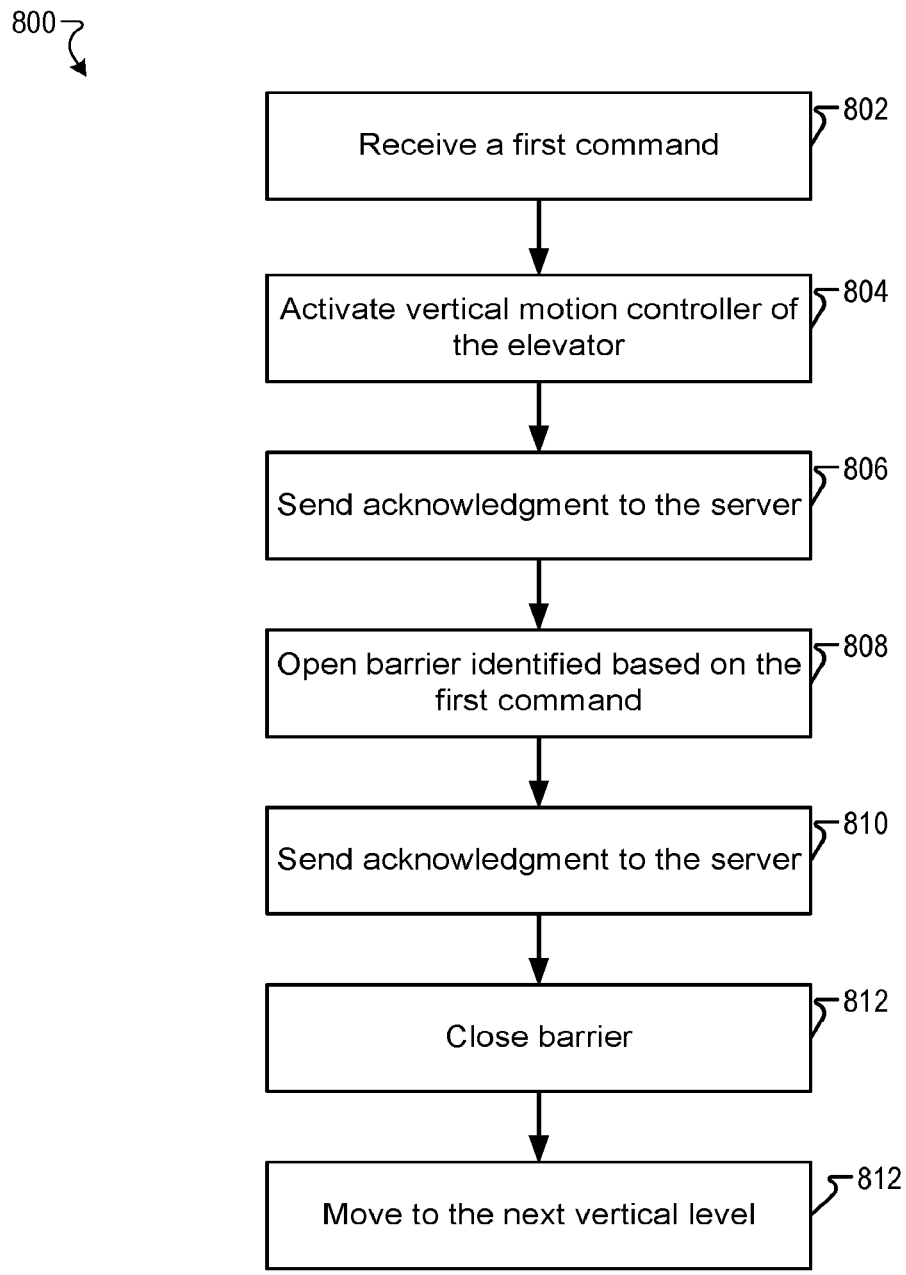
FIG. 8 is a flowchart for a process for controlling the transport device according to one example.

FIG. 8 is a flowchart for a process 800 for controlling a transport device 106 according to one example in which the transport device 106 is an elevator. The process 800 may be implemented by the transport device 106, the server 104, or the transport devices engine 404.

At step 802, the transport device 106 receives a first command from the server 104. The first command may include a vertical level associated with the destination of the transport device 106 in the case of an elevator. Further, the first command may include information such as moving speed. The first command may be the barrier identification information as described previously herein.

At step 804, the processing circuitry 206 may activate a vertical/horizontal motion controller of the transport device 106.

At step 806, the transport device 106 via the communication circuitry 208 sends an acknowledgment that the transport device 106 has reached the vertical level. The transport device 106 or server 104 may send a control signal to the bot 108 to move to the predefined position inside the transport device 106.

At step 808, the transport device 106 may output a control signal indicated by the first command received from the server 104 to open a barrier positioned at an opening of the transport device 106.

At step 810, the transport device 106 may output an acknowledgment to the server 104 indicating that the barrier is open. The server 104 may send a control signal to one or more bots 108 to enter/exit the transport device 106. At step 812, the transport device 106 may close the barrier. The transport device 106 may receive a signal from the server 104 to close the barrier. In other example, the transport device 106 may close the barrier based on a predetermined time included in the first command. For example, the server 104 based on the number of bots to exit/enter and based on the speed of each bot may predetermine the period between opening and closing the barrier.

At step 812, the transport device 106 may proceed to the next location (e.g., next vertical level) included in the first command or receive a second command (e.g., to load a second bot).

Steps 804-812 may be repeated to transport additional transport devices 106. For example, the first command may include multiple vertical levels.

Each transport device of the transport devices 106 may be assigned to a specific zone. In case of an emergency situation, the server 104 may send a control signal to all transport devices 106 assigned to the specific zone to be deactivated.

Figure 9:
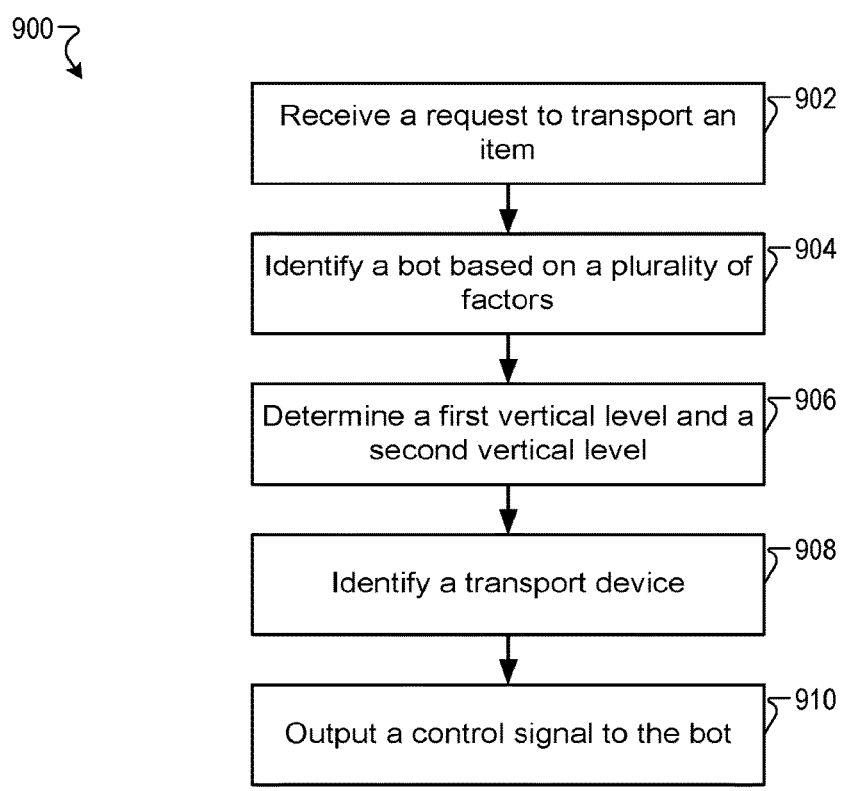
FIG. 9 is a flowchart for a process for multi floor robotics automation according to one example.

FIG. 9 is a flowchart for a process 900 for multi floor robotics automation according to one example. At step 902, the server 104 receives a request to transport an item from a first location to a second location.

At step 904, the server 104 identifies a bot 108 based on any one or more of a plurality of factors as described previously herein.

At step 906, the server 104 determines a first vertical level associated with an initial location of the bot 108 and a second vertical level associated with a final destination of the bot 108.

At step 908, the server 104 identifies a transport device 106 as described previously herein.

At step 910, the server 104 outputs one or more control signals to the bot 108 to move to a first position associated with the transport device 106. Further, the transport device 106 may send to the server 104 an acknowledgment signal when the transport device 106 reaches the vertical level of the bot 108. The server 104 may output a second control signal to the bot 108 when the status of the transport device 106 is ready. In some embodiments, the handshake between the lift and bot happens when the bot reaches the entry point. Whichever bot reaches the entry point first receives the lift for its usage according to some embodiments. Further, the server 104 may output one or more signals to one or more barriers associated with the transport device 106 to open and allow the bot 108 to enter, or one or more other bots to first exit, the transport device 106.

Figure 10:
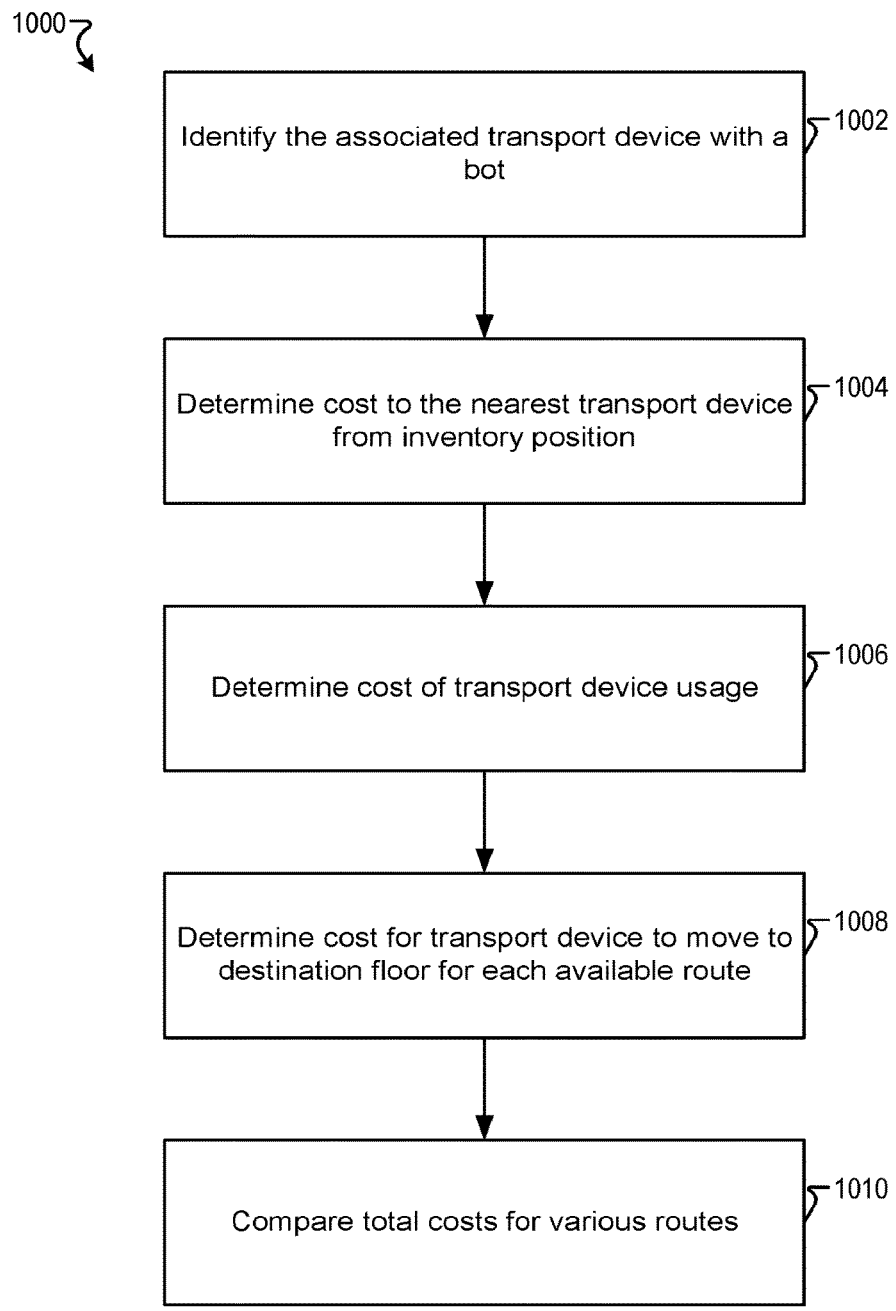
FIG. 10 is a flowchart for a process for determining a preferred route for the bot according to one example.

FIG. 10 is a flowchart for a process 1000 for determining a preferred route for the bot 108 according to one example. At step 1002, the server 104 identifies transport devices 106 associated with the bot 108. For example, the server 104 may identify all available transport devices that may be used by the bot 108 to reach the destination. At step 1004, the server 104 determines the cost to the nearest transport device from the inventory position. The cost may include travel time, energy usage, and the like. At step 1006, the server 104 may determine the cost of the transport device usage for each transport device available. At step 1008, the server 104 may determine the cost for the transport device to move to destination floor for each available route. At step 1010, the server 104 may compare the total cost for the various routes and for available transport devices and select the route with the lowest cost as the preferred route.

Figure 11:
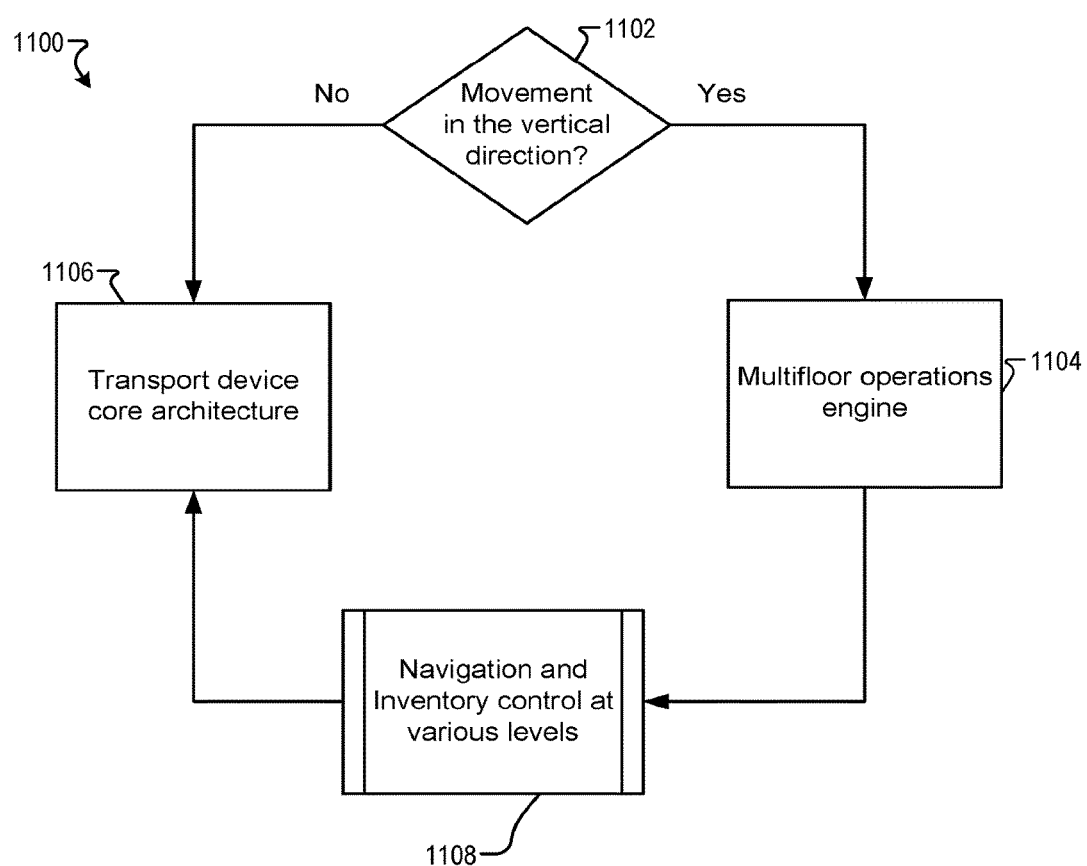
FIG. 11 is a flowchart for a process for managing a multifloor warehouse according to one example.

FIG. 11 is a flowchart for a process 1100 for managing a multifloor warehouse according to one example. At step 1102, the server 102 may determine whether a movement in the vertical direction is needed for a bot, a rack, a floating floor, or the like. In response to determining that a movement in the vertical direction is needed, resulting in a yes at step 1102, the process proceeds to step 1104. In response to determining that a movement in the vertical direction is not needed, resulting in a no at step 1102, the process proceeds to step 1106. A multifloor operation engine 1104 may control the movement of the bot, the rack, the floating floor, or the like. At step 1108, the multifloor operation engine 1104 may output navigation and inventory control at various levels (e.g., different floor levels). The control command for the transport devices 106 may be output to the transport device core architecture 1106, which may correspond to the transport devices engine 404 (FIG. 4).

Figure 12:
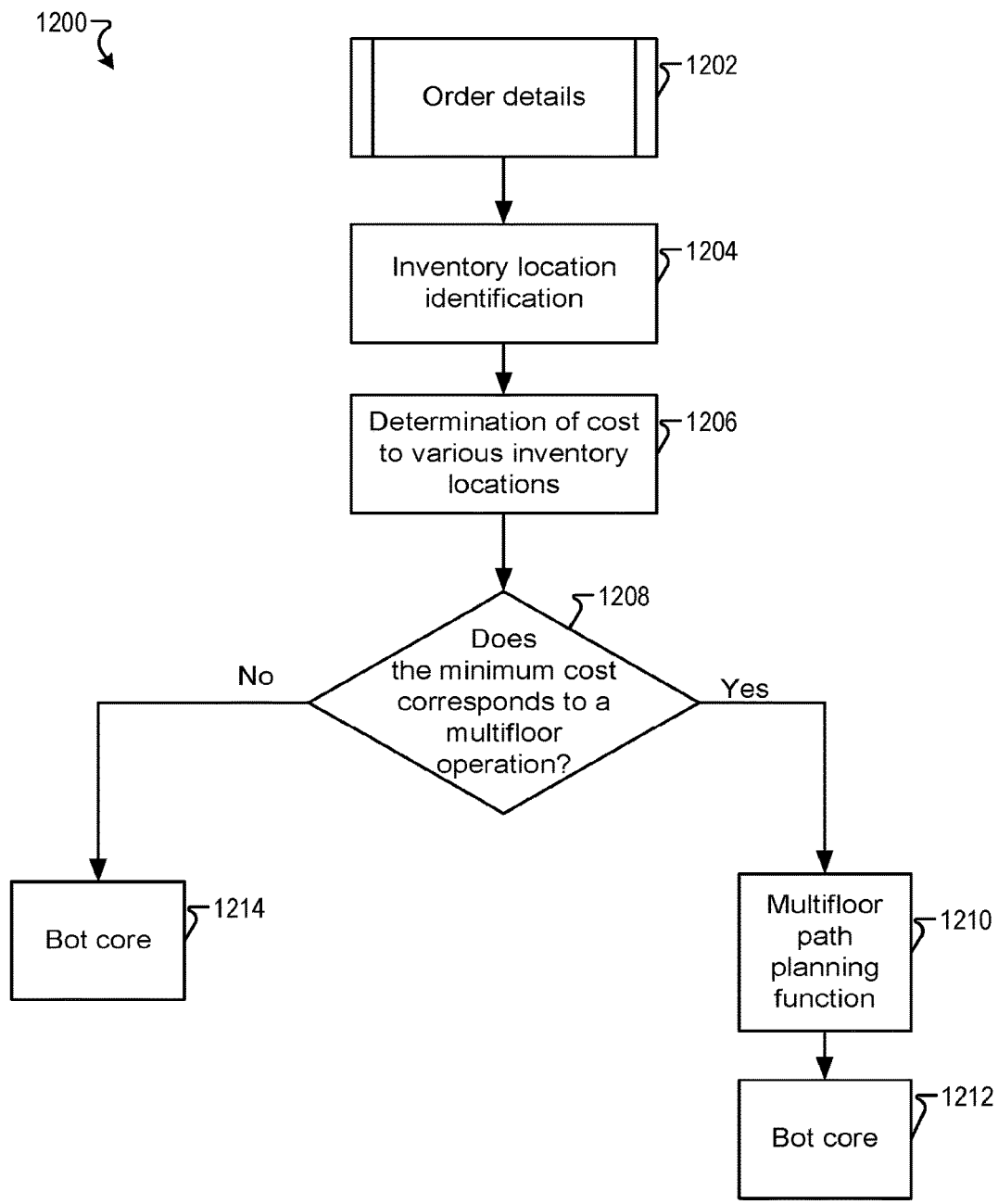
FIG. 12 is a flowchart for a process for identifying an inventory location according to one example.

FIG. 12 is a flowchart for a process 1200 for identifying an inventory location according to one example. At step 1202, an order details may be received by the server 104. At step 1204, the server 104 identifies the inventory location associated with the order details. The order may be retrieved from various locations of the warehouse. At step 1206, the server 104 determines the cost to various inventory locations. At step 1208, the server 1208 may check whether the minimum cost corresponds to a multifloor operation (i.e., retrieving the order involves changes in a vertical level). In response to determining that the minimum cost corresponds to a multifloor operation, the process proceeds to step 1210. In response to determining that the minimum cost does not correspond to a multifloor operation, the process proceeds to step 1214. At step 1214, the bots engine 406 may control the bot 108 to retrieve items associated with the order from location associated with the minimum cost. At step 1210, the multifloor path planning function may be implemented. For example, process 1000 of FIG. 10 may be implemented.

Figure 13:
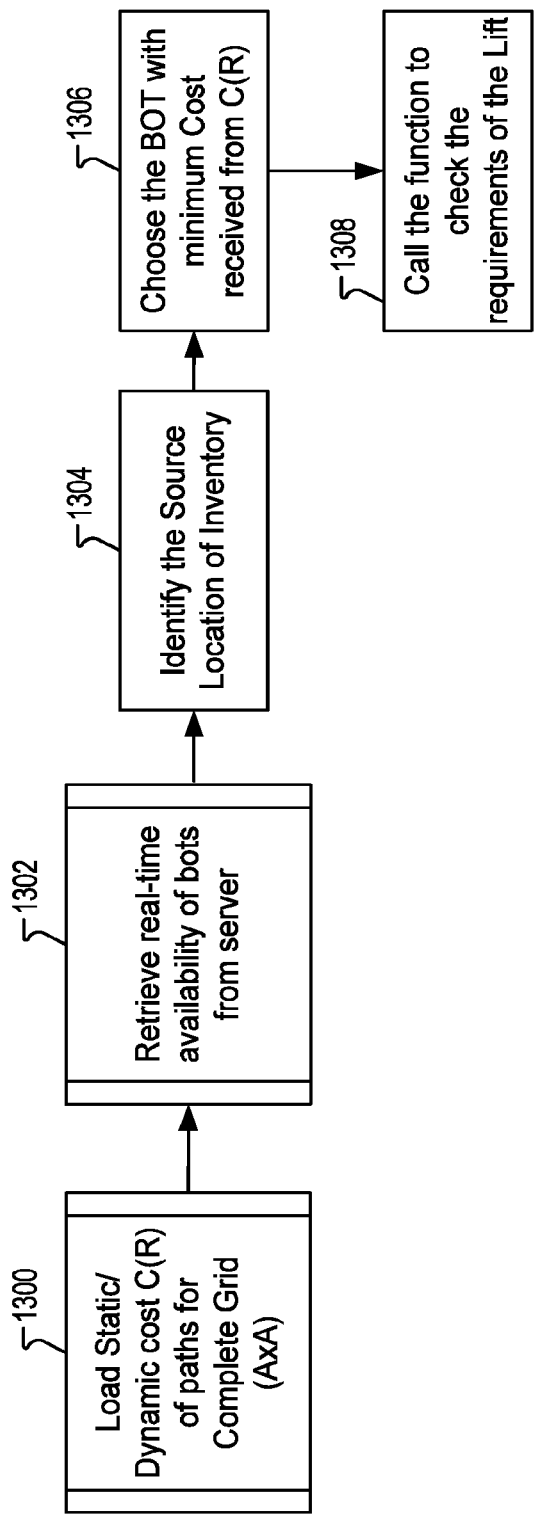
FIG. 13 is a flow chart for a process of choosing a bot in accordance with a cost according to one example.

FIG. 13 is a flow chart for a process for selecting a bot in accordance with a cost. In some embodiments, the process illustrated in FIG. 13 is performed by the warehouse control engine 402. The process in FIG. 13 may take place when step 904 (FIG. 9) is executed. The process may generally start at step 1300 where a static or dynamic cost C(R) of paths for a complete grid (AXA) is loaded. The complete grid (AxA) may represent the complete warehouse. The process proceeds to step 1302 where a real-time availability of the bots from the server is retrieved. For example, the warehouse control engine 402 may retrieve a report that indicates whether any one of the bots in the warehouse is currently available. This report may be associated with a predetermined validity period, where after this period elapses, the report is no longer valid and a new report is required to be retrieved. A bot may be considered as being available, for example, when the bot is not currently assigned to a task for moving inventory.

The process proceeds to step 1304 to identify the source location of inventory (e.g., original position of storage of inventory). The process proceeds to step 1306 where the bot with the minimum cost based on the received C(R) is chosen. For example, the bot with the lowest minimum cost is selected for transporting an item. In step 1308, a call to the function to check the requirements of the lift is performed. For example, after the bot is selected, it is determined whether a lift is required to transport an item.

Figure 14:
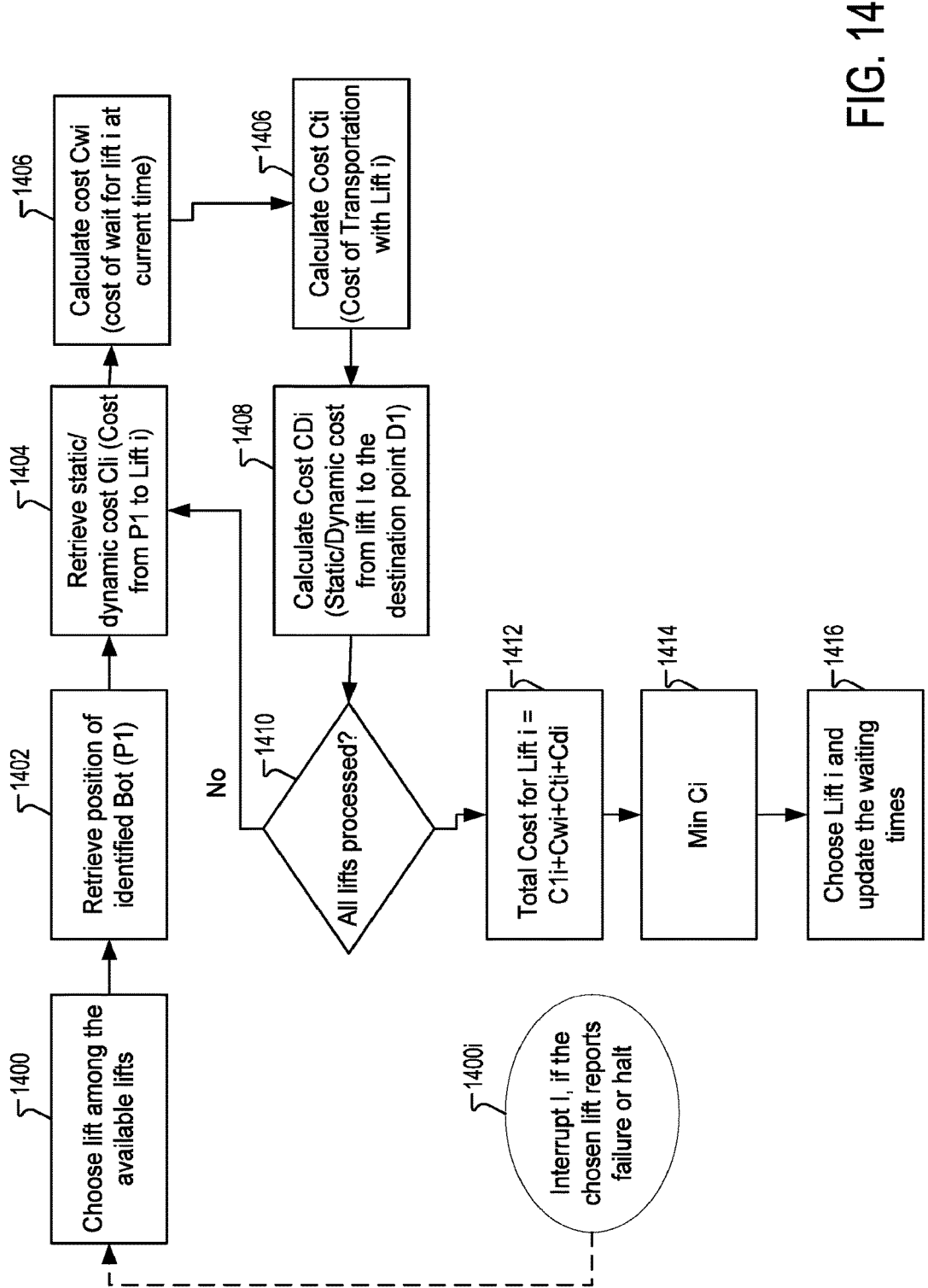
FIG. 14 is a flow chart for a process of choosing a lift in accordance with a cost according to one example.

FIG. 14 is a flow chart for a process for choosing a lift in accordance with a cost. In some embodiments, the process illustrated in FIG. 13 is performed by the warehouse control engine 402. As an example, the process in FIG. 14 may be performed if the decision in step 504 (FIG. 5) is "yes" or if it is determined after step 1308 (FIG. 13) that a lift is required. The process may start in step 1400 where a lift among the available lifts is chosen. When a lift is chosen, the process may be interrupted in step 1400$i$ if the chosen lift reports failure or a halt (e.g., lift stops moving before reaching desired destination).

The process proceeds to step 1402 where a position of an identified bot is retrieved. The identified bot may correspond to one of the bots indicated being available in step 1302. The process proceeds to step 1404 where the static or dynamic cost to move the identified bot from position P1 to chosen lift i is retrieved. The process proceeds to step 1406 where the cost (Cwi) to wait for chosen lift i at the current time is calculated. The process proceeds to step 1406 to calculate the cost (Cti) to use lift i for transportation. The cost Cti may be based, for example, on the speed of the lift or the floor of the destination. The process proceeds to step 1406 to calculate cost (CDi) to calculate the static or dynamic cost to move the bot from the lift i to a destination point D1 such as a destination for the inventory being carried by the robot.

The process proceeds to step 1410 to determine whether all lifts have been processed. For example, in step 1410, it is determined whether all the costs calculated in each of steps 1404-1408 have been determined for each available lift. If all the bots have not been processed, the process returns to step 1404. If all the lifts have been processed, the process proceeds to step 1412 to calculate the total cost for lift i (e.g., Cli+Cwi+Cti+Cdi). The process proceeds to step 1414 to determine the minimum Ci (total cost for lift i). The process proceeds to step 1416 to choose the lift i and update the waiting times. For example, the lift having the minimum Ci is chosen.

In some embodiments, that static cost referred to in FIGS. 13 and 14 refer to pre-calculated costs. Furthermore, in some embodiments, dynamic costs referred to in FIGS. 13 and 14 refer to predictive costs at a particular time such as the current time or the current time plus a predetermined offset.

Figure 15:
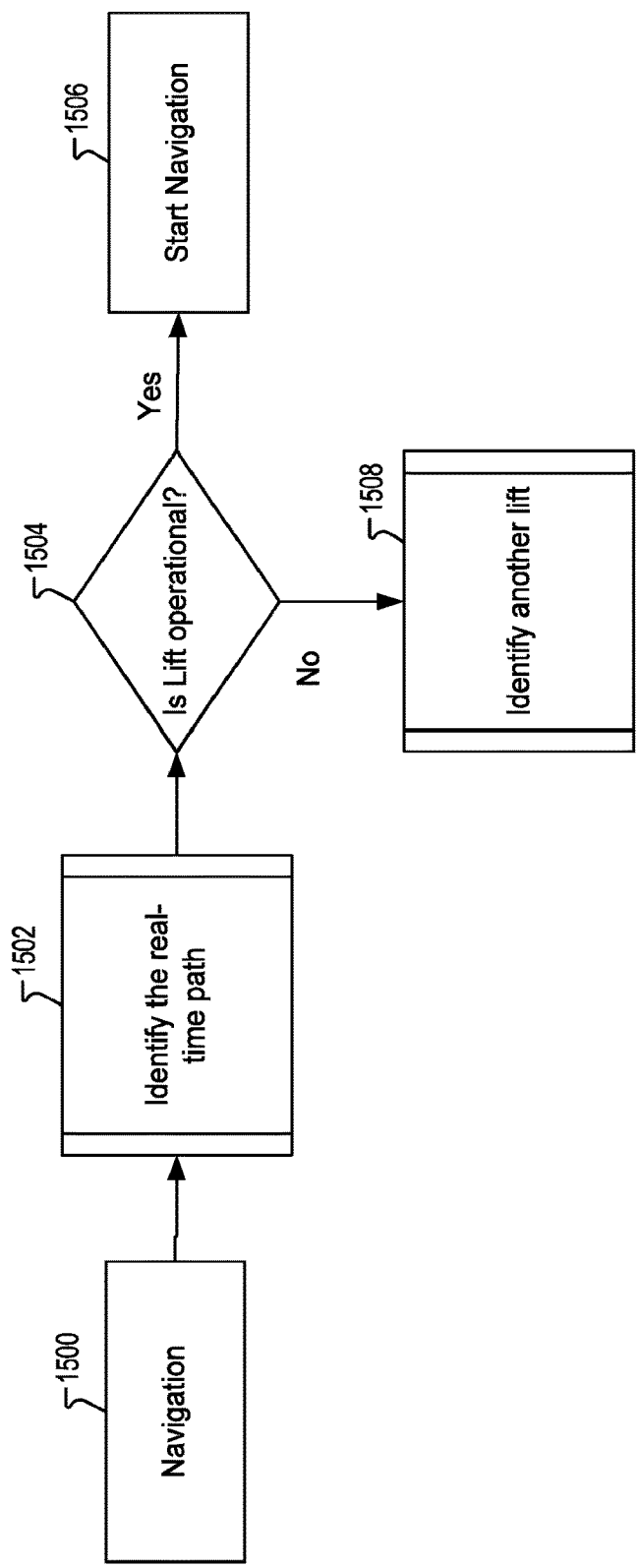
FIG. 15 is a flow chart for a process of managing a navigation of the bot according to one example.

FIG. 15 illustrates a process for controlling a navigation of a bot. The process in FIG. 15 may take place once the lift in step 1416 of FIG. 14 is chosen. The process may generally start in step 1500, where operation of the bot to the source of an item to be transported is started. The process proceeds to step 1502 to identify a real-time path. For example, the real-time path may be the path at the current time with the lowest transit time to the final destination of the bot. The real-time path may be identified using any algorithm known to one of ordinary skill in the art for determining the best path from a source to destination such as the Dijkstra alogrithim or the A* algorithm.

The process proceeds to step 1504, where it is determined whether a lift is operational. The lift being checked may correspond to the lift chosen in step 1416 (FIG. 14). If the lift is operational, the process proceeds to step 1506 to start navigation of the bot towards the lift. If the lift is not operational, the process proceeds to step 1508 to identify another lift. For example, in step 1508, the process illustrated in FIG. 14 may be repeated.

Figure 16:
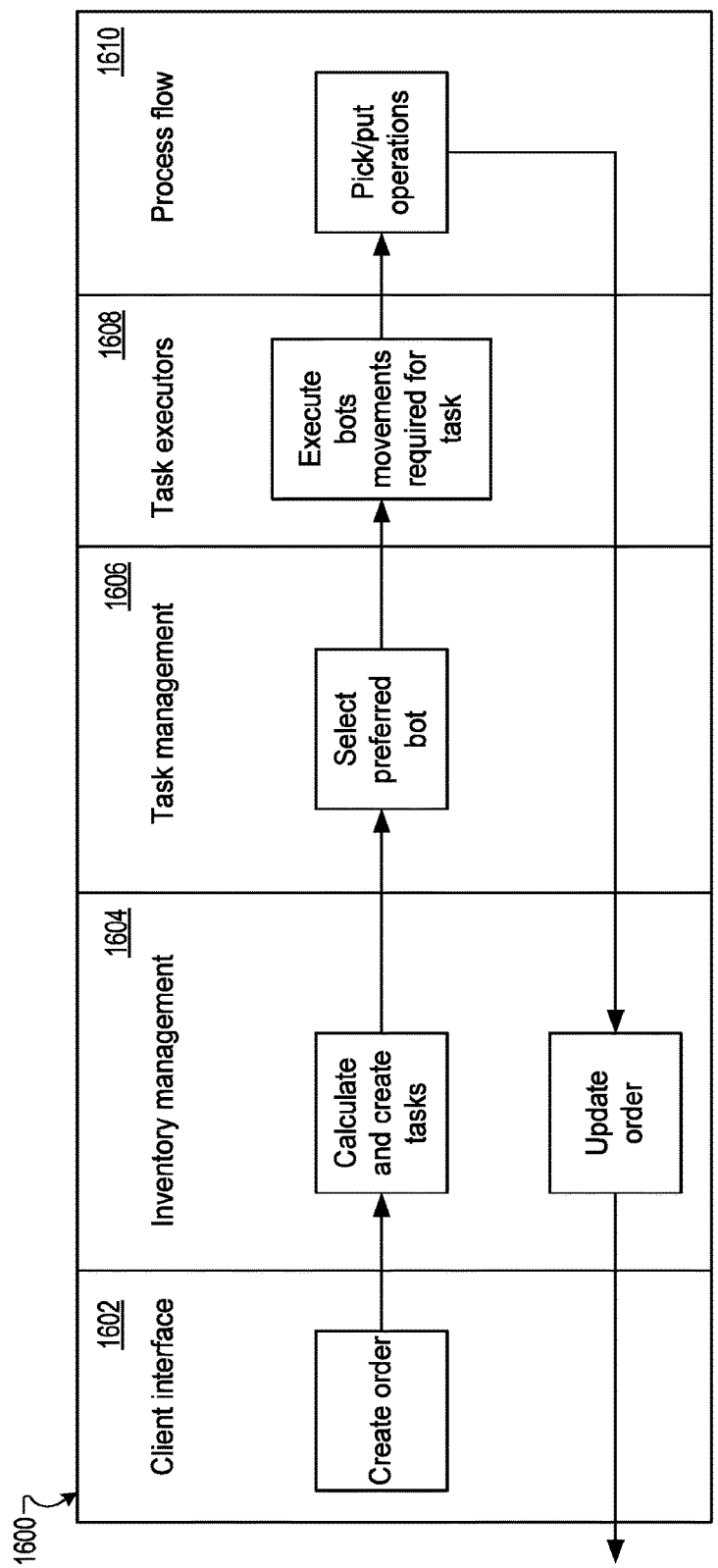
FIG. 16 is a schematic that shows an order flow in the system according to one example.

FIG. 16 is a schematic that shows an order flow 1600 in the system 102 according to one example. The order flow 1600 may include client interface 1602, inventory management 1604, task management 1606, task executors 1608, and process flow 1610. The client interface 1602 may include the creation of an order. The order may be received via the network 110. The order may be for retrieval or storage of one or more items. The inventory management 1604 may include calculating a cost of the order and updating the order once the pick/put operations are completed. The task management 1606 includes selecting a preferred bot. For example, the process 900 of FIG. 9 may be implemented. The task executors 1608 may include the command controls outputted from the transport devices engines 404 and the bots engine 406. The process flow 1610 may include the pick/put operations.

Figure 17:
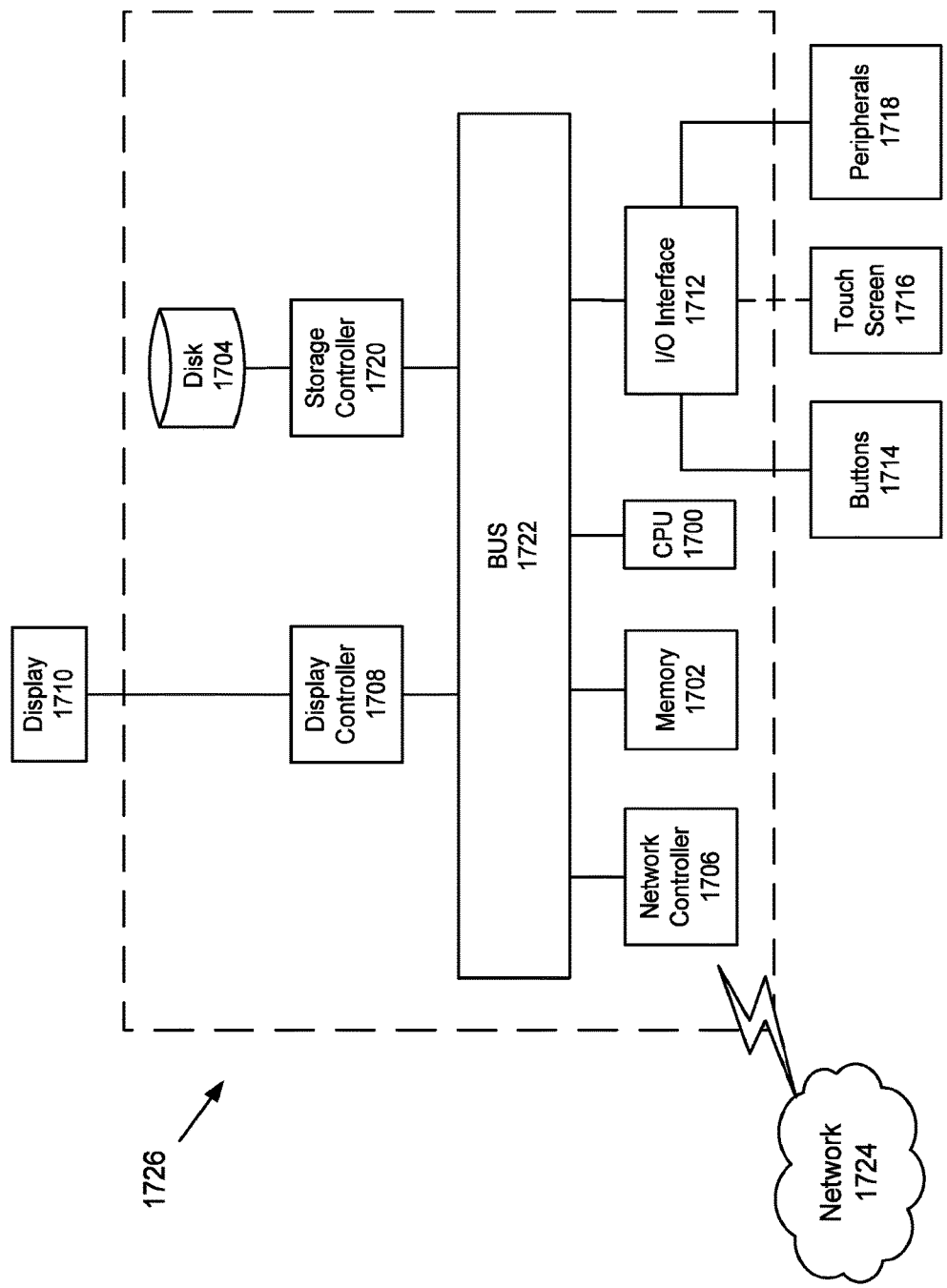
FIG. 17 is a block diagram of a computer according to one example.

In some embodiments, the functions and processes of the server 104 may be implemented by a computer 1726. Next, a hardware description of the computer 1726 according to exemplary embodiments is described with reference to FIG. 17. In FIG. 17, the computer 1726 includes a CPU 1700 which performs the processes described herein. The process data and instructions may be stored in memory 1702. These processes and instructions may also be stored on a storage medium disk 1704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1726 communicates, such as a server or computer.

Further, the claimed advancements may be provided as a utility application, background daemon, or component of an operating system, or combination thereof, executing in conjunction with CPU 1700 and an operating system such as Microsoft® Windows®, UNIX®, Oracle® Solaris, LINUX®, Apple macOS® and other systems known to those skilled in the art.

In order to achieve the computer 1726, the hardware elements may be realized by various circuitry elements, known to those skilled in the art. For example, CPU 1700 may be a Xenon® or Core® processor from Intel Corporation of America or an Opteron® processor from AMD of America, or may be other processor types that would be recognized by one of ordinary skill in the art. Alternatively, the CPU 1700 may be implemented on an FPGA, ASIC, PLD or using discrete logic circuits, as one of ordinary skill in the art would recognize. Further, CPU 1700 may be implemented as multiple processors cooperatively working in parallel to perform the instructions of the inventive processes described above.

The computer 1726 in FIG. 17 also includes a network controller 1706, such as an Intel Ethernet PRO network interface card from Intel Corporation of America, for interfacing with network 1724. As can be appreciated, the network 1724 can be a public network, such as the Internet, or a private network such as LAN or WAN network, or any combination thereof and can also include PSTN or ISDN sub-networks. The network 1724 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1726 further includes a display controller 1708, such as a NVIDIA® GeForce® GTX or Quadro® graphics adaptor from NVIDIA Corporation of America for interfacing with display 1710, such as a Hewlett Packard® HPL2445w LCD monitor. A general purpose I/O interface 1712 interfaces with a keyboard and/or mouse 1714 as well as an optional touch screen panel 1716 on or separate from display 1710. General purpose I/O interface also connects to a variety of peripherals 1718 including printers and scanners, such as an OfficeJet® or DeskJet® from Hewlett Packard®.

The general purpose storage controller 1720 connects the storage medium disk 1704 with communication bus 1722, which may be an ISA, EISA, VESA, PCI, or similar, for interconnecting all of the components of the computer 1726. A description of the general features and functionality of the display 1710, keyboard and/or mouse 1714, as well as the display controller 1708, storage controller 1720, network controller 1706, and general purpose I/O interface 1712 is omitted herein for brevity as these features are known.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

(1) A method for multi floor robotics automation includes receiving a request to transport an item from a first location to a second location; selecting, using processing circuitry of a server, a bot from a plurality of bots for transporting the item from the first location to the second location, the bot selected based on at least a type of the item to be transported; determining, using the processing circuitry, a first vertical level associated with an initial location of the selected bot and a second vertical level associated with a destination of the selected bot; determining whether the first vertical level associated with the initial location of the selected bot is different than the second vertical level associated with the destination of the selected bot; and in response to the determination that the first vertical level is different from the second vertical level, (a) selecting, using the processing circuitry, a transport device configured to transfer the selected bot from the first vertical level to the second vertical level in a vertical direction; and (b) outputting a control signal to the selected bot, the control signal causing the selected bot to move to a first position associated with the selected transport device.

(2) The method of feature (1), in which the initial location of the selected bot is an original location of the selected bot prior to the request being received, and the destination of the selected bot is the first location of the item.

(3) The method of feature (1) or (2), in which the initial location of the selected bot is the first location of the item after pickup of the item, and the destination of the selected bot is the second location for delivery of the item.

(4) The method of feature (2) or (3), in which the first location is a first building, and the second location is a second building having a different location than the first building.

(5) The method according to any one of features (1)-(4), in which selecting the transport device includes: determining a first cost associated with a transport device usage for each available transport device; determining a second cost for moving each available transport device to the second location; determining a third cost for moving the bot to each available transport device; determining a plurality of routes for the bot to move from the initial position of the bot to the bot destination, each route associated with a total cost including the first cost, the second cost, and the third cost for each available transport device; and selecting a preferred route from the plurality of routes, the preferred route having a lowest total cost from the plurality of routes.

(6) The method of any one of features (1)-(5), further including determining a status of the selected transport device indicating a readiness level; and outputting a second control signal to the selected bot to move to a second position located inside the selected transport device when the determined status of the selected transport device indicates that the selected transport device is ready to receive the selected bot.

(7) The method of feature (6), in which determining the status of the selected transport device includes: receiving an acknowledgement from the selected transport device indicating that the selected transport device has reached a vertical level corresponding to the first vertical level and the barrier is in the open position.

(8) The method according to any one of features (1)-(7), in which the selected transport device includes a single opening for entry and exit of the selected bot.

(9) The method according to any one of features (1)-(8), in which the selected transport device includes a first opening for entry of the selected bot and a second opening for exit of the selected bot.

(10) The method according to any one of features (1)-(9), in which selecting the transport device is performed in accordance with at least a status of each transport device of a plurality of transport devices, a current position of the selected bot, a bot type, and a transport device capacity.

(11) The method according to any one of features (1)-(10), further including outputting a third control signal to the selected transport device, the third control signal being a function of a barrier identification to indicate a vertical level associated with a destination of the selected transport device.

(12) The method according to any one of features (1)-(11), further including associating a set of one or more transport devices with a zone; and deactivating the set when an emergency event is detected in the zone.

(13) The method according to any one of features (1)-(12), further including activating the selected transport device to move from the first vertical level corresponding to the initial position of the selected bot to the second vertical level corresponding to the destination of the selected bot; actuating a barrier from a closed position to an open position when the transport device reaches the second vertical level; receiving an acknowledgment from the selected transport device indicating that the selected transport device has reached the second vertical level and the barrier is in the open position; and outputting a fourth control signal to the selected bot, the fourth control signal causing the selected bot to move from a position inside the selected transport device to a second position outside the selected transport device.

(14) The method according to any one of features (1)-(13), in which the selected transport device is configured to transport multiple bots of one or more bot types.

(15) The method according to any one of features (1)-(14), further including: determining an inventory level for an item at a specific vertical level; and controlling one or more bots to move a stack of the item to the specific vertical level when the inventory level is below a predetermined threshold.

(16) The method according to any one of features (1)-(15), further including determining a vertical utilization level for a rack; determining a stack height based on the vertical utilization level; and controlling one or more bots to move a stack having the determined stack height to the rack.

(17) A system for multi floor robotics automation, the system including one or more transport devices configured to transfer bots in a vertical direction; a plurality of bots; and a server including processing circuitry configured to receive a request to transport an item from a first location to a second location, select a bot from the plurality of bots for transporting the item from the first location to the second location, the bot selected based on at least a type of the item to be transported, determine a first vertical level associated with an initial location of the bot and a second vertical level associated with a destination of the selected bot, determine whether the first vertical level associated with the initial location of the selected bot is different than the second vertical level associated with the destination of the selected bot, and in response to the determination that the first vertical level is different from the second vertical level, (a) select a transport device from the one or more transport devices to transfer the selected bot from the first vertical level to the second vertical level, and (b) output a control signal to the selected bot, the control signal causing the selected bot to move to a first position associated with the selected transport device.

(18) The system of feature (17), in which the processing circuitry is further configured to determine a status of the transport device indicating a readiness level; and output a second control signal to the selected bot to move to a second position located inside the selected transport device when the status of the selected transport device indicates that the selected transport device is ready to receive the selected bot.

(19) The system according to feature (17) or (18), in which the initial location of the selected bot is an original location of the selected bot prior to the request being received, and the destination of the selected bot is the first location of the item.

(20) The system according to any one of features (17)-(19), in which the initial location of the selected bot is the first location of the item after pickup of the item, and the destination of the selected bot is the second location for delivery of the item.

The invention claimed is:

1. A method for multi floor robotics automation, the method comprising:
   receiving a request to transport an item from a first location to a second location;
   selecting, using processing circuitry of a server, a bot from a plurality of bots for transporting the item from the first location to the second location, the bot selected based on at least a type of the item to be transported;
   determining, using the processing circuitry, a first vertical level associated with an initial location of the selected bot and a second vertical level associated with a destination of the selected bot;
   determining whether the first vertical level associated with the initial location of the selected bot is different than the second vertical level associated with the destination of the selected bot; and
   in response to the determination that the first vertical level is different from the second vertical level,
      (a) selecting, using the processing circuitry, a transport device configured to transfer the selected bot from the first vertical level to the second vertical level in a vertical direction; and
      (b) outputting a control signal to the selected bot, the control signal causing the selected bot to move to a first position associated with the selected transport device.

2. The method of claim 1, wherein the initial location of the selected bot is an original location of the selected bot prior to the request being received, and the destination of the selected bot is the first location of the item.

3. The method of claim 1, wherein the initial location of the selected bot is the first location of the item after pickup of the item, and the destination of the selected bot is the second location for delivery of the item.

4. The method of claim 2, wherein the first location is a first building, and the second location is a second building having a different location than the first building.

5. The method of claim 1, wherein the selecting the transport device includes:
   determining a first cost associated with a transport device usage for each available transport device;
   determining a second cost for moving each available transport device to the second location;
   determining a third cost for moving the bot to each available transport device;
   determining a plurality of routes for the bot to move from the initial position of the bot to the bot destination, each route associated with a total cost including the first cost, the second cost, and the third cost for each available transport device; and
   selecting a preferred route from the plurality of routes, the preferred route having a lowest total cost from the plurality of routes.

6. The method of claim 1, further comprising:
   determining a status of the selected transport device indicating a readiness level; and
   outputting a second control signal to the selected bot to move to a second position located inside the selected transport device when the determined status of the selected transport device indicates that the selected transport device is ready to receive the selected bot.

7. The method of claim 6, wherein the determining the status of the selected transport device includes:
   receiving an acknowledgement from the selected transport device indicating that the selected transport device has reached a vertical level corresponding to the first vertical level and the barrier is in the open position.

8. The method of claim 1, wherein the selected transport device includes a single opening for entry and exit of the selected bot.

9. The method of claim 1, wherein the selected transport device includes a first opening for entry of the selected bot and a second opening for exit of the selected bot.

10. The method of claim 1, wherein the selecting the transport device is performed in accordance with at least a status of each transport device of a plurality of transport devices, a current position of the selected bot, a bot type, and a transport device capacity.

11. The method of claim 1, further comprising:
   outputting a third control signal to the selected transport device, the third control signal being a function of a barrier identification to indicate a vertical level associated with a destination of the selected transport device.

12. The method of claim 1, further comprising:
   associating a set of one or more transport devices with a zone; and
   deactivating the set when an emergency event is detected in the zone.

13. The method of claim 1, further comprising:
   activating the selected transport device to move from the first vertical level corresponding to the initial position of the selected bot to the second vertical level corresponding to the destination of the selected bot;
   actuating a barrier from a closed position to an open position when the transport device reaches the second vertical level;
   receiving an acknowledgment from the selected transport device indicating that the selected transport device has reached the second vertical level and the barrier is in the open position; and
   outputting a fourth control signal to the selected bot, the fourth control signal causing the selected bot to move from a position inside the selected transport device to a second position outside the selected transport device.

14. The method of claim 1, wherein the selected transport device is configured to transport multiple bots of one or more bot types.

15. The method of claim 1, further comprising:
   determining an inventory level for an item at a specific vertical level; and
   controlling one or more bots to move a stack of the item to the specific vertical level when the inventory level is below a predetermined threshold.

16. The method of claim 1, further comprising:
   determining a vertical utilization level for a rack;
   determining a stack height based on the vertical utilization level; and
   controlling one or more bots to move a stack having the determined stack height to the rack.

17. A system for multi floor robotics automation, the system comprising:
   one or more transport devices configured to transfer bots in a vertical direction;
   a plurality of bots; and
   a server including processing circuitry configured to
      receive a request to transport an item from a first location to a second location,
      select a bot from the plurality of bots for transporting the item from the first location to the second location, the bot selected based on at least a type of the item to be transported,
      determine a first vertical level associated with an initial location of the bot and a second vertical level associated with a destination of the selected bot,
      determine whether the first vertical level associated with the initial location of the selected bot is different than the second vertical level associated with the destination of the selected bot, and
      in response to the determination that the first vertical level is different from the second vertical level,
         (a) select a transport device from the one or more transport devices to transfer the selected bot from the first vertical level to the second vertical level, and
         (b) output a control signal to the selected bot, the control signal causing the selected bot to move to a first position associated with the selected transport device.

18. The system of claim 17, wherein the processing circuitry is further configured to:
   determine a status of the transport device indicating a readiness level; and
   output a second control signal to the selected bot to move to a second position located inside the selected transport device when the status of the selected transport device indicates that the selected transport device is ready to receive the selected bot.

19. The system of claim 17, wherein the initial location of the selected bot is an original location of the selected bot prior to the request being received, and the destination of the selected bot is the first location of the item.

20. The system of claim 17, wherein the initial location of the selected bot is the first location of the item after pickup of the item, and the destination of the selected bot is the second location for delivery of the item.

* * * * *